United States Patent [19]

Satomi et al.

[11] Patent Number: 5,602,431
[45] Date of Patent: Feb. 11, 1997

[54] LINEAR MOTOR

[75] Inventors: Hirobumi Satomi; Takao Iwasa, both of Kashiwa, Japan

[73] Assignee: Oriental Motor Co., Ltd., Tokyo, Japan

[21] Appl. No.: 315,063

[22] Filed: Sep. 29, 1994

[30] Foreign Application Priority Data

Sep. 29, 1993 [JP] Japan .................. 5-242372

[51] Int. Cl.$^6$ ............................... H02K 41/02
[52] U.S. Cl. ................ 310/14; 310/12; 310/68 B
[58] Field of Search ............... 310/12, 13, 14, 310/68 B, 49 R; 318/135

[56] References Cited

U.S. PATENT DOCUMENTS

| | | | |
|---|---|---|---|
| 3,441,819 | 4/1969 | Palmero | 318/115 |
| 5,418,413 | 5/1995 | Satomi | 310/12 |
| 5,438,227 | 8/1995 | Satomi | 310/14 |
| 5,528,090 | 6/1996 | Satomi | 310/12 |

FOREIGN PATENT DOCUMENTS

| | | |
|---|---|---|
| 0319096 | 6/1989 | European Pat. Off. . |
| 2906404 | 8/1980 | Germany . |

OTHER PUBLICATIONS

Patent Abstracts of Japan, vol. 13, No. 198 (E-756), May 11, 1989 & JP-A-01 019 958 (Japan Servo), Jan. 24, 1989.
IEEE Industry Applications Society Annual Meeting, 1991, pp. 115–120, Iwabuchi et al, "A novel inductor type high–torque motor with rare–each magnet".

Primary Examiner—Thomas M. Dougherty
Assistant Examiner—Judson H. Jones
Attorney, Agent, or Firm—Jacobson, Price, Holman & Stern, PLLC

[57] ABSTRACT

A linear motor is operated as an m-phase linear pulse motor or a brushless DC linear motor capable of producing large driving force. The linear motor includes an even number N of salient poles 11, 12, ... disposed at an equal pitch angle and includes a stator 1 having a plurality of permanent magnet poles disposed on inner peripheral surfaces of the salient poles to have polarities different from each other in the shaft direction and a mover 3 disposed movably in the shaft direction. The salient poles are constituted by pairs of the salient poles adjacent to each other and include m sets of salient pole groups each composed of (N/m) salient poles disposed at an angle of (720 m/N) degrees and windings W1, W2, ... wound on (N/m)–1 or (N/m)–2 salient poles belonging to the salient pole groups are connected to have opposite polarities between the pair of salient poles and are connected to have the same polarity between the salient poles which do not constitute the pair of salient poles and are disposed to interpose the salient poles for the other phase to constitute phase windings for m phases. Remaining salient poles of the salient pole group are caused to detect a position and a movement direction of the mover 3 as sensor poles $S_A$ and $S_B$.

3 Claims, 9 Drawing Sheets

F I G. 10
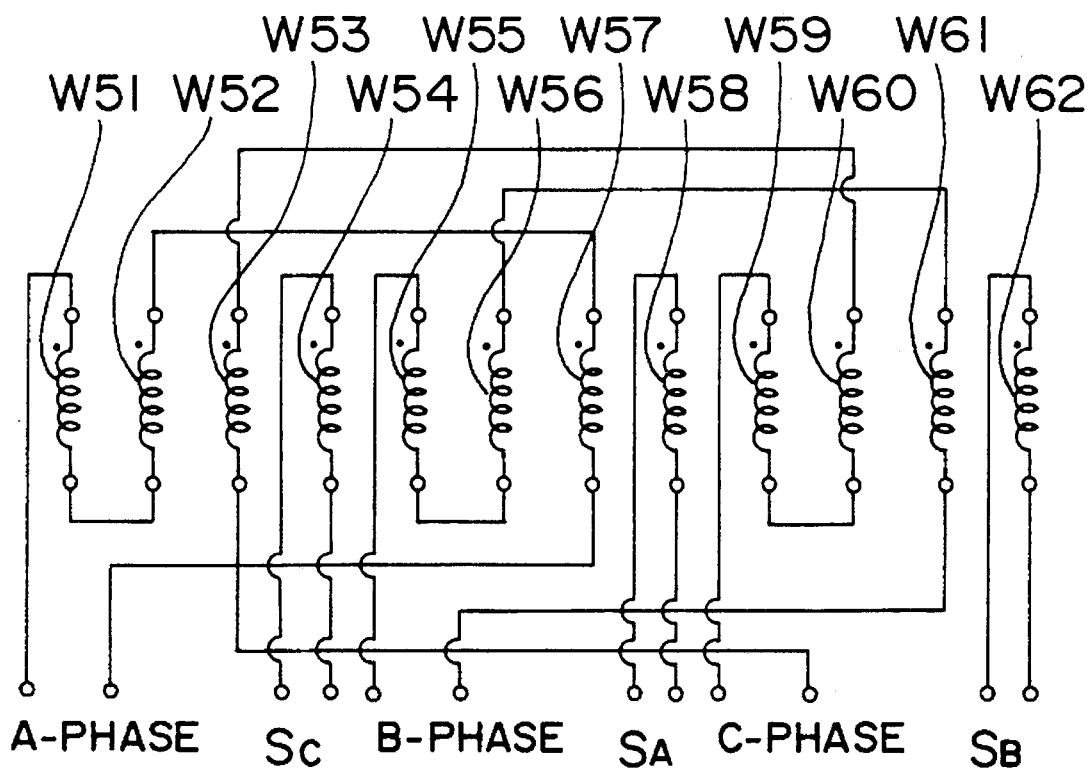

LINEAR MOTOR

FIELD OF THE INVENTION AND RELATED ART STATEMENT

The present invention relates to a linear motor, and more particularly to a linear motor operating as a two-phase and a multi-phase linear pulse motor or a brushless DC linear motor.

FIG. 11 is a longitudinal sectional view illustrating a permanent magnet type cylindrical linear motor pertinent to the present invention.

In FIG. 11, a stator core 101 of a stator 100 of the permanent magnet type cylindrical linear motor includes a ring-like yoke portion having a small inner diameter and forming ring-like stator tooth tops 102a and a ring-like yoke portion having a large inner diameter and forming ring-like stator tooth bottoms 102b, both the yoke portions being laminated alternately in the shaft direction. Thus, stator teeth 102 composed of a number of ring-like tooth tops 102a and ring-like tooth bottoms (grooves) 102b are formed in the inner peripheral surface of the stator core 101 at equal pitches in the shaft direction.

Ring-like windings 103, 104, . . . 110 are disposed in the ring-like tooth bottoms (grooves) 102b, respectively. The ring-like windings 103, 104, . . . 110 are configured to have two phases in total as shown in FIG. 12 so that the ring-like windings 103, 105, 107 and 109 are connected so that the polarities thereof are reversed alternately to form one phase (A phase) and the ring-like windings 104, 106, 108 and 110 are connected so that the polarities thereof are reversed alternately to form the other phase (B phase). Since the stator 100 is configured as above, the pole pitch of the stator 100 is four times the tooth pitch of the stator teeth 102.

Further, A mover core 301 of a mover 300 is cylindrical and permanent magnet poles 302 magnetized to have the polarities different radially are disposed on the outer periphery of the mover core alternately in the shaft direction at a pitch equal to twice the tooth pitch of the stator teeth 102. Consequently, the pole pitch of the mover 300 is four times the pitch of the stator teeth and is coincident with the pole pitch of the stator 100.

The two-phase windings disposed in the stator core 101 are shifted from each other by the tooth pitch of the stator teeth, that is, a quarter of the pole pitch of the stator in the shaft direction, and the linear motor constitutes a two-phase permanent magnet type cylindrical linear pulse motor having a basic amount of movement for each step which is equal to a quarter of the pole pitch, that is, the pitch of the stator teeth.

In the permanent magnet type cylindrical linear pulse motor as configured above, however, in order to connect the ring-like windings 103, 104, . . . 110, it is necessary to provide notches in the outer peripheral portion of the ring-like yoke portions of the tooth tops 102a and the tooth bottoms 102b and pull out ends of the windings 103, 104, . . . 110 from the notches so that the pulled-out ends are connected and are accommodated in lead pulling-out grooves formed in the notches. Accordingly, there is a problem that the operation efficiency of the motor assembly is deteriorated.

On the other hand, the size of the tooth bottoms 102b of the stator teeth 102 for accommodating the windings 103, 104, . . . 110 is depending on the pitch of the stator teeth. When the pitch of the stator teeth is small, the tooth bottom 102b cannot be made larger and the ampere-conductors per phase cannot be increased. Accordingly, there is a problem that the driving force is low.

Further, since the motor includes the permanent magnet poles disposed on the side of the mover, the length of the motor is required to be longer than a sum of the length in the shaft direction of the mover core and the length of a stroke and there is a problem that the length of the motor is made longer when the stroke is lengthened.

In addition, since the motor is of the permanent magnet type, the motor can be operated as a brushless DC motor theoretically, while there is a problem that it is necessary to provide sensor means for detecting the position of the mover separately for that purpose and the length of the motor is made longer correspondingly.

OBJECT AND SUMMARY OF THE INVENTION

The present invention has been made in view of the above problems and an object of the present invention is to solve the problems and provide a permanent magnet type linear motor including permanent magnet poles disposed on the side of the stator and which has the improved operation efficiency of the windings and the motor assembly and can increase winding accommodation portions without dependence on the tooth pitch of the stator teeth to attain large driving force.

It is another object of the present invention to provide a permanent magnet type linear motor capable of being operated as a brushless DC motor in order to form a linear servo system inexpensively without addition of sensor means for detecting the position of the mover separately.

In order to achieve the objects, in the linear motor comprising a stator including a stator core having an even number of salient poles disposed at an equal pitch angle radially inward and windings wound on the salient poles individually and a mover including a mover core disposed within the stator to be supported movably in the shaft direction and having a plurality of mover teeth disposed on an outer peripheral surface thereof in the shaft direction, the present invention is configured as follows:

(1) A plurality of permanent magnet poles magnetized radially to have polarities different alternately in the shaft direction are disposed at an equal pitch on inner peripheral surfaces of the salient poles of the stator core and the mover teeth are disposed at a pitch equal to twice the disposition pitch of the permanent magnet poles, the mover core being formed by laminating mover core elements each formed by laminating a predetermined number of mover iron plates of the mover core with the mover core elements being rotated sequentially by an angle determined by an arrangement of teeth disposed on outer peripheral portions of the mover iron plates, the stator salient poles being constituted by pairs of the salient poles adjacent to each other and including m sets of salient pole groups each composed of (N/m) salient poles disposed uniformly at an angle of (720 m/N) degrees where the number of salient poles is N and the phase number of the motor is m, the windings wound on (N/m)−1 or (N/m)−2 salient poles belonging to the salient pole groups being connected to have opposite polarities to each other between the pair of salient poles and being connected to have the same polarity to each other between the salient poles which do not constitute the pair of salient poles and are disposed opposite to each other to interpose the salient pole pair belonging to other salient poles therebetween to constitute phase windings for m phases, remaining salient poles which do not participate in phase configuration of the salient pole group for the phases being caused to detect a position in the shaft direction and a movement direction of the mover as sensor poles, whereby the linear motor can be operated as an m-phase linear pulse motor or a brushless DC linear motor.

(2) The stator core includes 8k salient poles when the phase number m is 2 and k is an integer larger than or equal to 1, and k sets of tooth groups each set having two teeth disposed with an angle of (135/k) degrees therebetween are disposed on an outer peripheral portion of the mover iron plate, the tooth groups being disposed with an angle of (360/k) degrees one another, the mover core being formed by the mover core elements laminated with sequential rotation by (135/k) degrees, a disposition pitch of the permanent magnet poles disposed on the stator core being 4t when a thickness of the stator core element in the shaft direction is t.

(3) The stator core includes 12k salient poles when the phase number m is 3 and k is an integer larger than or equal to 1, and k sets of tooth groups each set having two teeth disposed with an angle of (150/k) degrees therebetween are disposed on an outer peripheral portion of the mover iron plate, the tooth groups being disposed with an angle of (360/k) degrees one another, the mover core being formed by the mover core elements laminated with sequential rotation by (150/k) degrees, a disposition pitch of the permanent magnet poles disposed on the stator core being 6t when a thickness of the stator core element in the shaft direction is t.

In operation of the present invention, since the permanent magnet type linear motor configured above includes the stator windings wound on the salient poles and disposed in the circumferential direction of the stator, the operation efficiency of the windings is improved and the winding accommodation portion can be enlarged to increase the ampere-conductors without dependency on the tooth pitch of the stator teeth, so that the linear motor having large driving force can be realized.

Further, since the permanent magnet poles are disposed on the side of the stator, a long stroke can be obtained without increasing the length of the motor.

Further, since parts of the stator salient poles can be utilized as sensor poles for detecting a position and a movement direction of the mover, the linear motor can be operated as a brushless DC linear motor without the provision of position detection means such as a conventional encoder or resolver separately.

BRIEF DESCRIPTION OF THE DRAWINGS

FIG. 10 is a connection diagram of stator windings;

DETAILED DESCRIPTION OF THE PREFERRED EMBODIMENTS

Preferred embodiments of the present invention are now described illustratively in detail with reference to the accompanying drawings.

Figure 1:
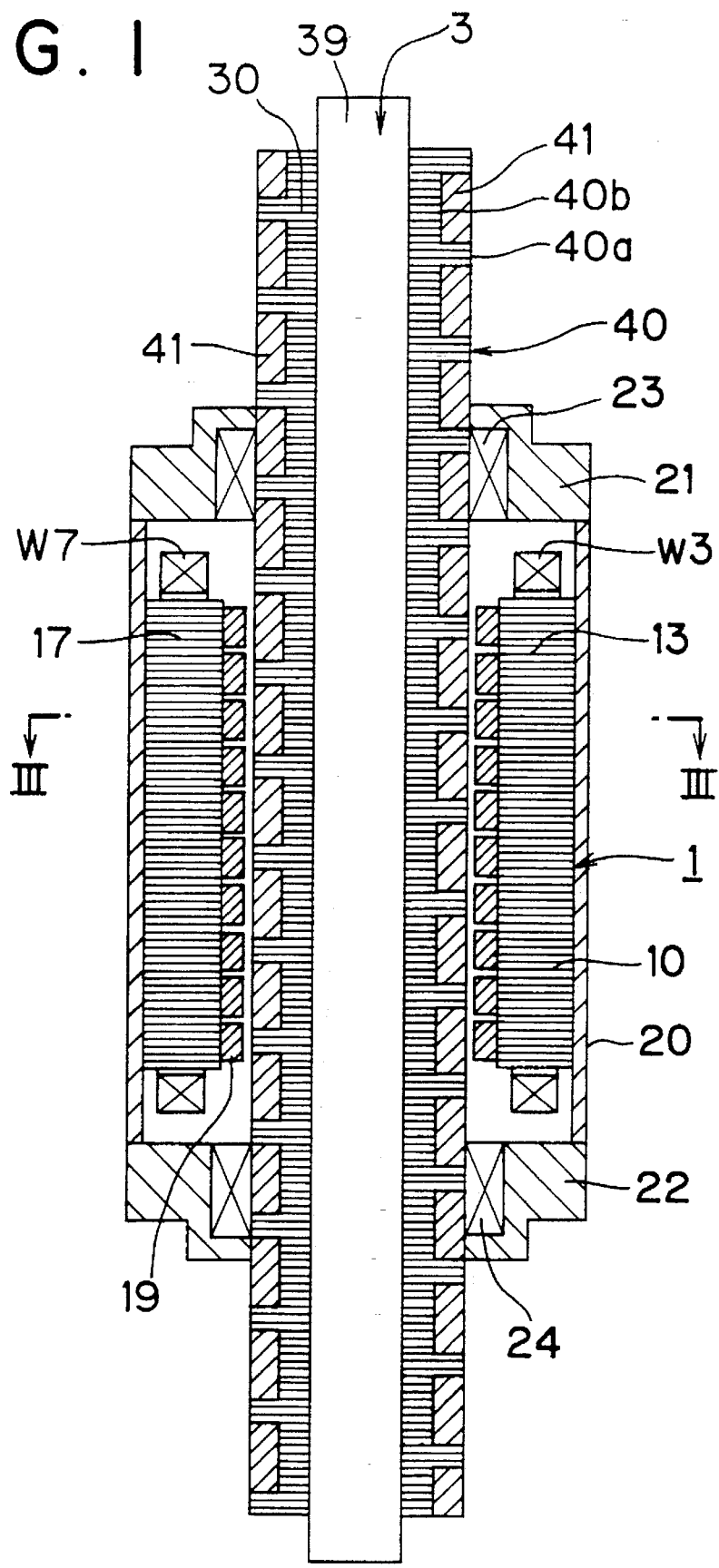
FIG. 1 is a longitudinal sectional view illustrating an embodiment of a linear motor according to the present invention.
Figure 2:
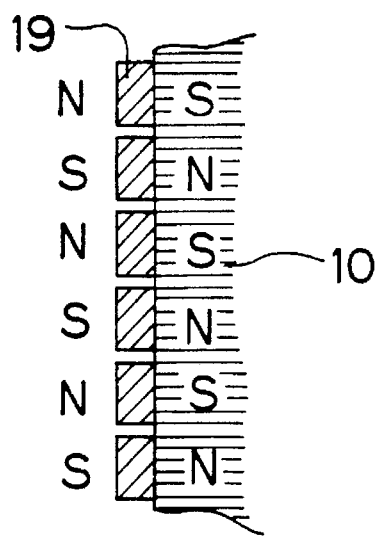
FIG. 2 is an partially enlarged view of a stator core of FIG. 1.
Figure 3:
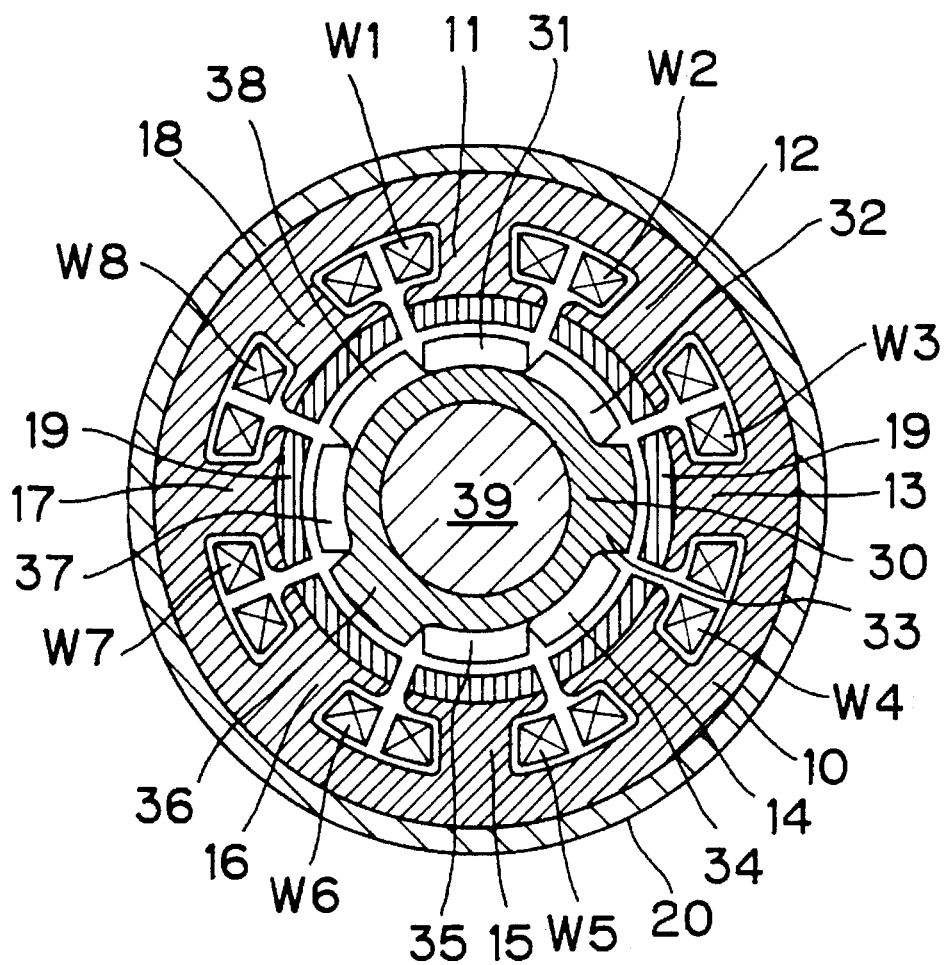
FIG. 3 is a transverse sectional view taken along line III—III of FIG. 1.

FIG. 1 is a longitudinal sectional view illustrating an embodiment of a linear motor of the present invention, FIG. 2 is a partially enlarged view of a stator core of FIG. 1 and FIG. 3 is a transverse sectional view taken along line III—III of FIG. 1.

The embodiment shows the case where the number of phases m and an integer k are m=2 and k=1, respectively, and accordingly the number of stator salient poles N is N=8k=8.

In FIGS. 1 to 3, a stator 1 includes a stator core 10 and stator windings W1, W2, W3, . . . W8. A plurality of permanent magnet poles 19 are disposed at an equal pitch in the shaft direction on inner peripheral surfaces of an even number of, eight in the embodiment, salient poles 11, 12, 13, . . . 18 disposed at an equal pitch angle radially inward from the stator core 10 and are magnetized in the radial direction so that the polarities at inner peripheral surfaces of the permanent magnet poles 19 become N and S poles alternately.

The permanent magnet poles 19 disposed on the inner peripheral surfaces of the salient poles 11, 12, 13, . . . 18 are disposed to have the same polarity at the same position in the shaft direction and eight permanent magnet poles 19 disposed at the same position in the shaft direction are formed into a ring cut by openings between the salient poles.

The stator core 10 including the stator windings W1, W2, W3, . . . W8 wound on the eight salient poles 11, 12, 13, . . . 18, respectively, is accommodated and supported in a housing 20 by means of brackets 21 and 22 and screws not shown.

On the other hand, a mover 3 disposed within the stator 1 is supported movably in the shaft direction through bearings 23 and 24 by the brackets 21 and 22. A plurality of mover teeth 40 (tooth tops 40a and tooth bottoms 40b) are disposed at outer peripheral portions 31, 32, 33, . . . 38 of a mover core 30 of the mover opposite to the eight salient poles 11, 12, 13, . . . 18 in the direction of a shaft 39 of the mover core at an pitch equal to twice the disposition pitch of the permanent magnet poles 19 and the tooth bottoms 40b are filled with nonmagnetic members 41, so that the outer peripheral surface of the mover core 30 is finished to have a single cylindrical surface.

Figure 4:
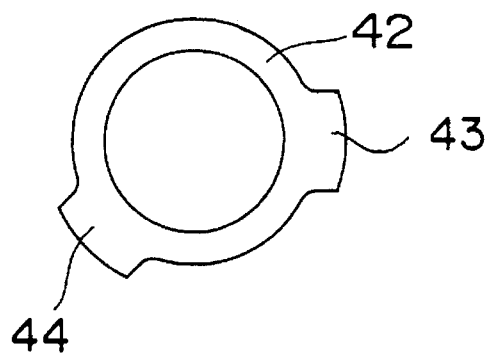
FIG. 4 is a plan view of a mover iron plate forming a mover core.

FIG. 4 shows an example of a mover iron plate 42 forming the mover core 30. In FIG. 4;, numerals 43 and 44 denote two teeth disposed at the outer peripheral portion of the mover iron plate 42 and which constitute a set of teeth disposed at an angle of 135/k degrees or 135 degrees (for k=1) therebetween. The embodiment shows the case where k=1, that is, there is a set of teeth 43 and 44, while for the case of, for example, k=2, there are two sets of teeth each set having two teeth disposed at an angle of 135/k degrees, or 67.5 degrees, and the two sets of teeth are disposed in the outer peripheral direction at an angle of 360/k degrees or 180 degrees therebetween.

Figure 5:
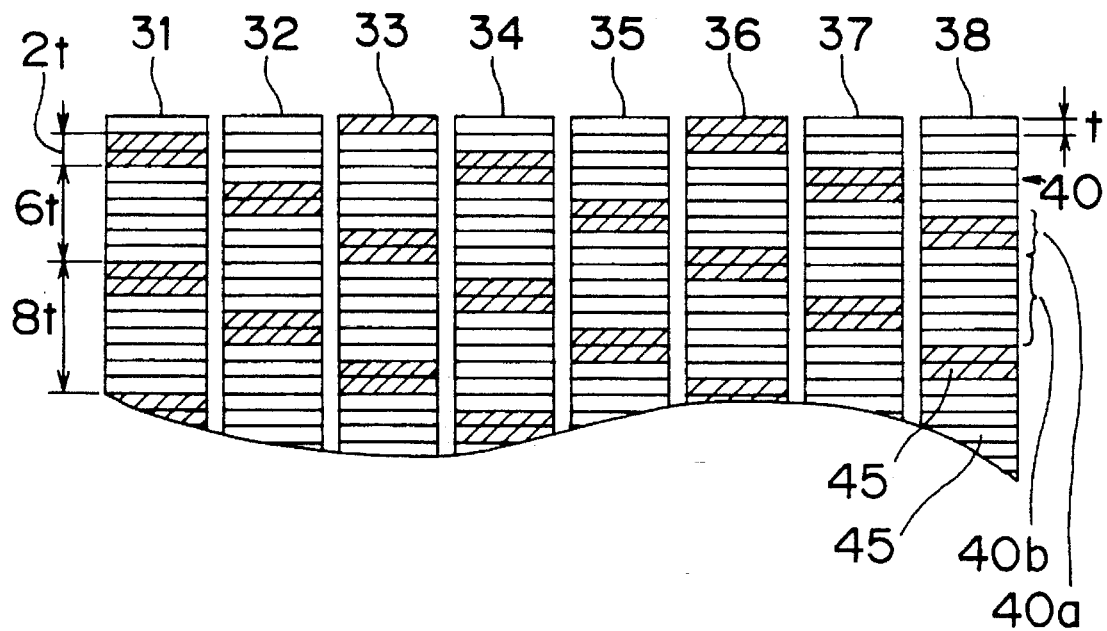
FIG. 5 is an expanded view of mover teeth formed by laminating the mover iron plates of FIG. 4 with rotation by a predetermined angle as viewed from a stator.

FIG. 5 shows the mover teeth 40 of outer peripheral portions 31, 32, 33, . . . 38 of the mover core 30 formed by laminating mover core elements 45 formed by a predetermined number of mover iron plates 42 laminated to have a thickness of t with the mover core elements 45 being rotated by an angle of 135/k degrees or 135 degrees for k=1 as viewed from the stator 1. Hatched portions represent the tooth tops 40a and blank or unhatched portions represent the tooth bottoms 40b. By laminating the mover core elements 45 with sequential rotation, teeth 40 having a tooth pitch of 8t (the thickness of the tooth is 2t and the thickness of the tooth bottom is 6t) are formed at the outer peripheral portions 31, 32, 33, . . . 38. Accordingly, a pitch of the permanent magnet poles 19 disposed in the stator core 10 is 4t (a half of the pitch of the mover teeth).

Furthermore, as apparent from FIG. 5, the shift of the teeth 40 of the outer peripheral portions with respect to the outer peripheral portion 31 is ⅜ of the tooth pitch for the outer peripheral portion 32, 6/8 for the outer peripheral portion 33, 9/8 (or ⅛) for the outer peripheral portion 34, 4/8 for the outer peripheral portion 35, ⅞ for the outer peripheral portion 36, 10/8 (or 2/8) for the outer peripheral portion 37 and ⅝ for the outer peripheral portion 38. The teeth of the adjacent outer peripheral portions are shifted by ⅜ of the tooth pitch from each other.

In FIG. 3, two pairs of salient poles 11, 12 and 15, 16 disposed adjacent to each other constitute one set of salient pole group composed of N/m salient poles, that is, 4 salient poles having a relation disposed uniformly at an angle of (720 m/N) degrees, that is, 180 degrees for m=2 and N=8k=8. Further, salient poles 13, 14 and 17, 18 constitute one set of salient pole group composed of four salient poles having the same disposition relation, so that m=2 sets of salient pole groups are formed as a whole.

Figure 6:
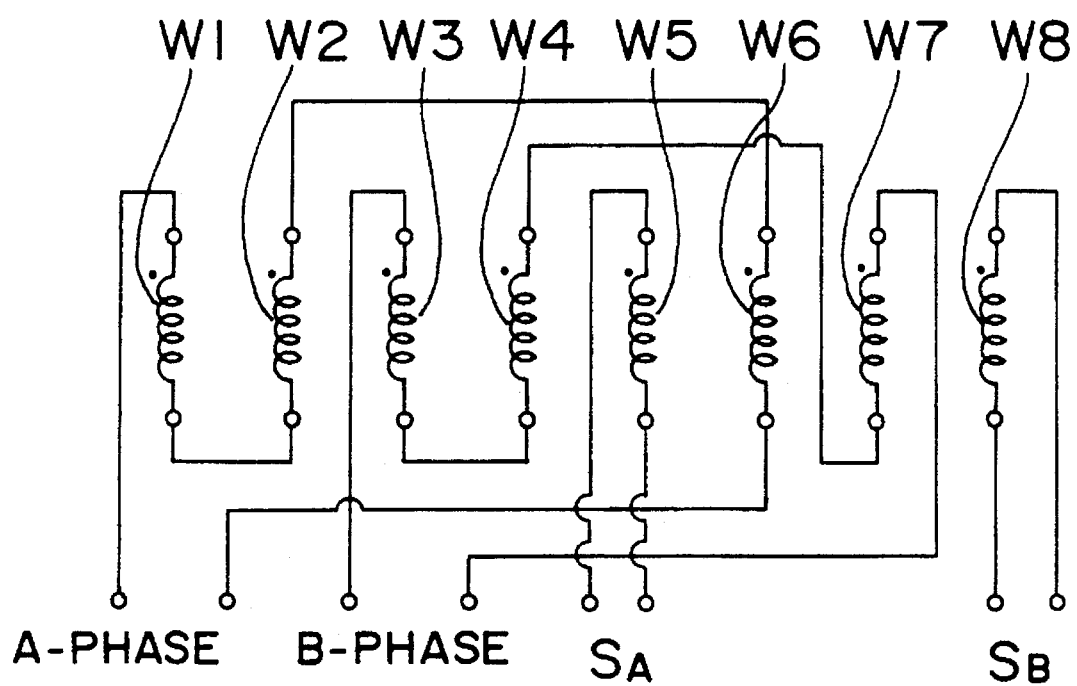
FIG. 6 is a connection diagram of stator windings.

Windings W1, W2, W6 and W3, W4, W7 wound on {(N/m)−1} or three salient poles of four salient poles constituting each of the salient pole groups, that is, salient poles 11, 12, 16 and 13, 14, 17 are connected as shown in FIG. 6 to form A and B phases, respectively, to thereby constitute a two-phase motor.

With the windings for the phases A and B, as shown in FIG. 6, the windings W1 and W2 wound on the pair of salient poles adjacent to each other are connected to have opposite polarities to each other and the windings W1 and W6 wound on the salient poles 11 and 16 disposed to interpose the salient poles 17 and 18 of the other phase therebetween are connected to have the same polarity to constitute the A phase. Similarly, the windings W3 and W4 wound on the pair of salient poles 13 and 14 adjacent to each other are connected to have opposite polarities to each other and the windings W4 and W7 wound on the salient poles 14 and 17 disposed to interpose the salient poles 15 and 16 of the other phase therebetween are connected to have the same polarity to constitute the B phase.

Further, the salient poles 15 and 18 which do not participate in the phase configuration of the salient pole group and the windings W5 and W8 thereof constitute sensor poles $S_A$ and $S_B$, respectively.

With the above configuration, when the salient pole pairs 11, 12; 15, 16; 13, 14; and 17, 18 of the salient pole group are excited, each pair forms a closed magnetic path and each of the closed magnetic paths is configured not to have a common magnetic path.

The sensor poles $S_A$ and $S_B$ are excited by a high-frequency oscillator not shown and can detect an inductance varied in accordance with a positional relation of the mover teeth 40 and the permanent magnetic poles 19 of the sensor poles $S_A$ and $S_B$. That is, when the permanent magnet poles 19 of the sensor poles $S_A$ and $S_B$ are opposite to the tooth tops 40a of the mover teeth 40, the inductance is maximum, and when the permanent magnet poles 19 of the sensor poles $S_A$ and $S_B$ are opposite to the tooth bottoms 40b of the mover teeth 40 with a space therebetween, the inductance is minimum. In addition, since the mover teeth 40 is shifted in phase in the shaft direction as described above, the sensor poles can produce mover position signals shifted in phase by 90 degrees in an electric angle.

Accordingly, with the above configuration, the two-phase permanent magnet type cylindrical linear pulse motor including the position sensors can be configured. In this case, the basic amount of movement for each step is a quarter of the tooth pitch of the mover teeth 40, that is, 2t (where t is a thickness of the mover core element 45). Further, since the sensor poles $S_A$ and $S_B$ for detecting the position and the movement direction of the mover 3 are provided, the linear pulse motor can be operated as a brushless DC servo motor.

Figure 7:
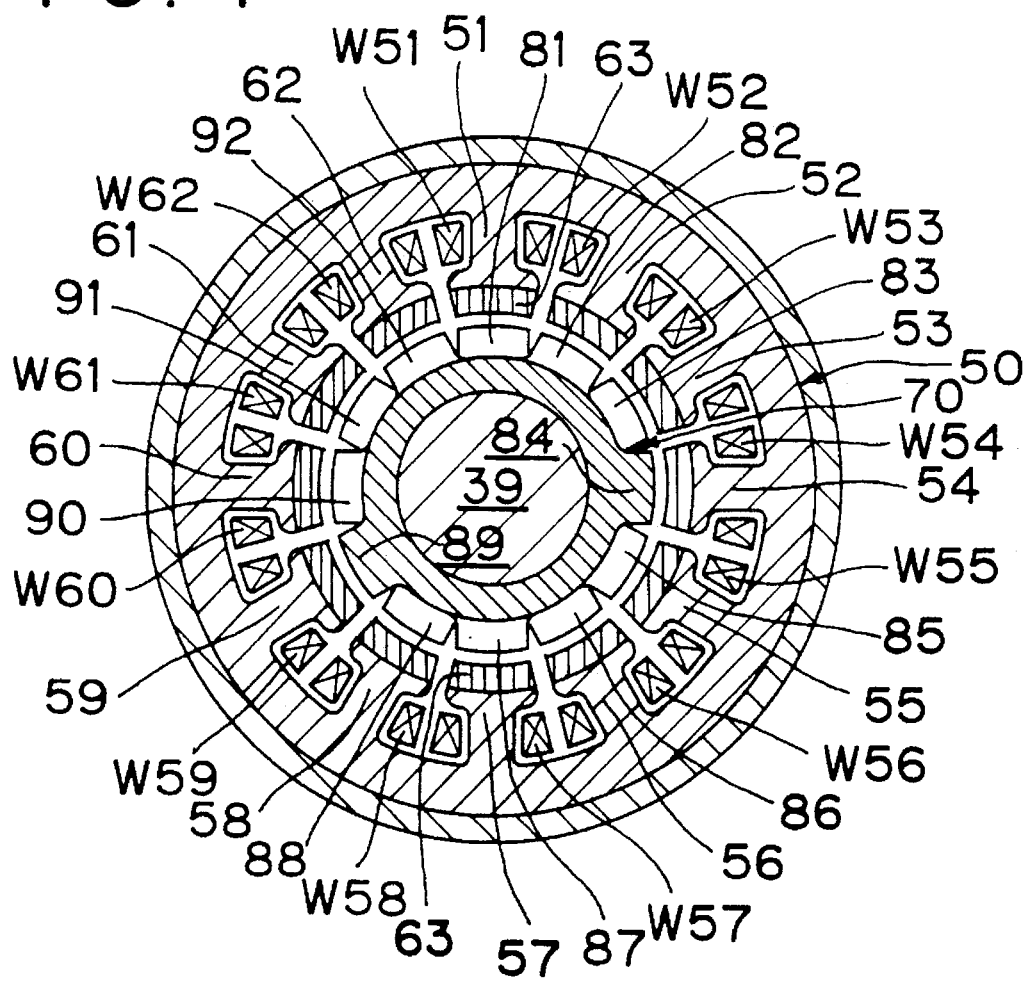
FIG. 7 is a transverse sectional view illustrating another embodiment of a linear motor (3-phase) of the present invention.

FIGS. 7 to 11 illustrate another embodiment of a linear motor according to the present invention. FIG. 7 is a transverse sectional view which is similar to FIG. 3 of the preceding embodiment.

The embodiment shows the case where the phase number m and the integer k are m=3 and k=1, respectively, and accordingly the number N of the stator salient poles is N=12k=12. The embodiment of FIG. 7 is the same as the embodiment of FIG. 1 with the exception of the following description.

In FIG. 7, a plurality of permanent magnet poles 63 are disposed at an equal pitch in the shaft direction on inner peripheral surfaces of twelve salient poles 51, 52, 53, . . . 62 disposed at an equal pitch angle radially inward from a stator core 50 and are magnetized radially so that the polarities at inner peripheral surfaces of the permanent magnet poles 63 become N and S poles alternately. Further, stator windings W51, W52, W53, . . . W62 are wound on the twelve salient poles 51, 52, 53, . . . 62, respectively.

Figure 8:
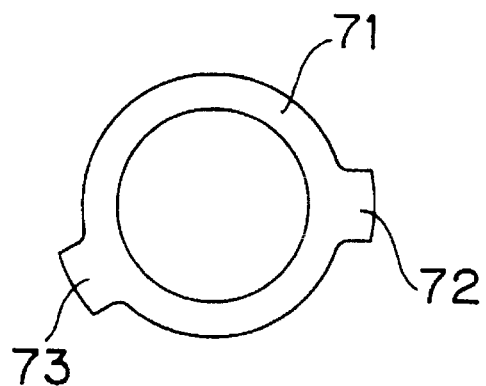
FIG. 8 is a plan view of a mover iron plate forming a mover core of FIG. 7.

FIG. 8 shows an example of a mover iron plate 71 forming a mover core 70. In FIG. 8, numerals 72 and 73 denotes two teeth disposed on an outer peripheral portion of the mover iron plate 71 and which constitute a set of teeth disposed with an angle of 150/k degrees or 150 degrees (for k=1) therebetween. The embodiment shows the case of k=1, that is, the case where there is one set of teeth 72 and 73, while there are provided two sets of teeth each set having two teeth disposed with an angle of 150/k degrees or 75 degrees for the case of k=2, for example, and the two sets of teeth are formed in the outer peripheral direction with an angle of 360/k degrees or 180 degrees therebetween.

Figure 9:
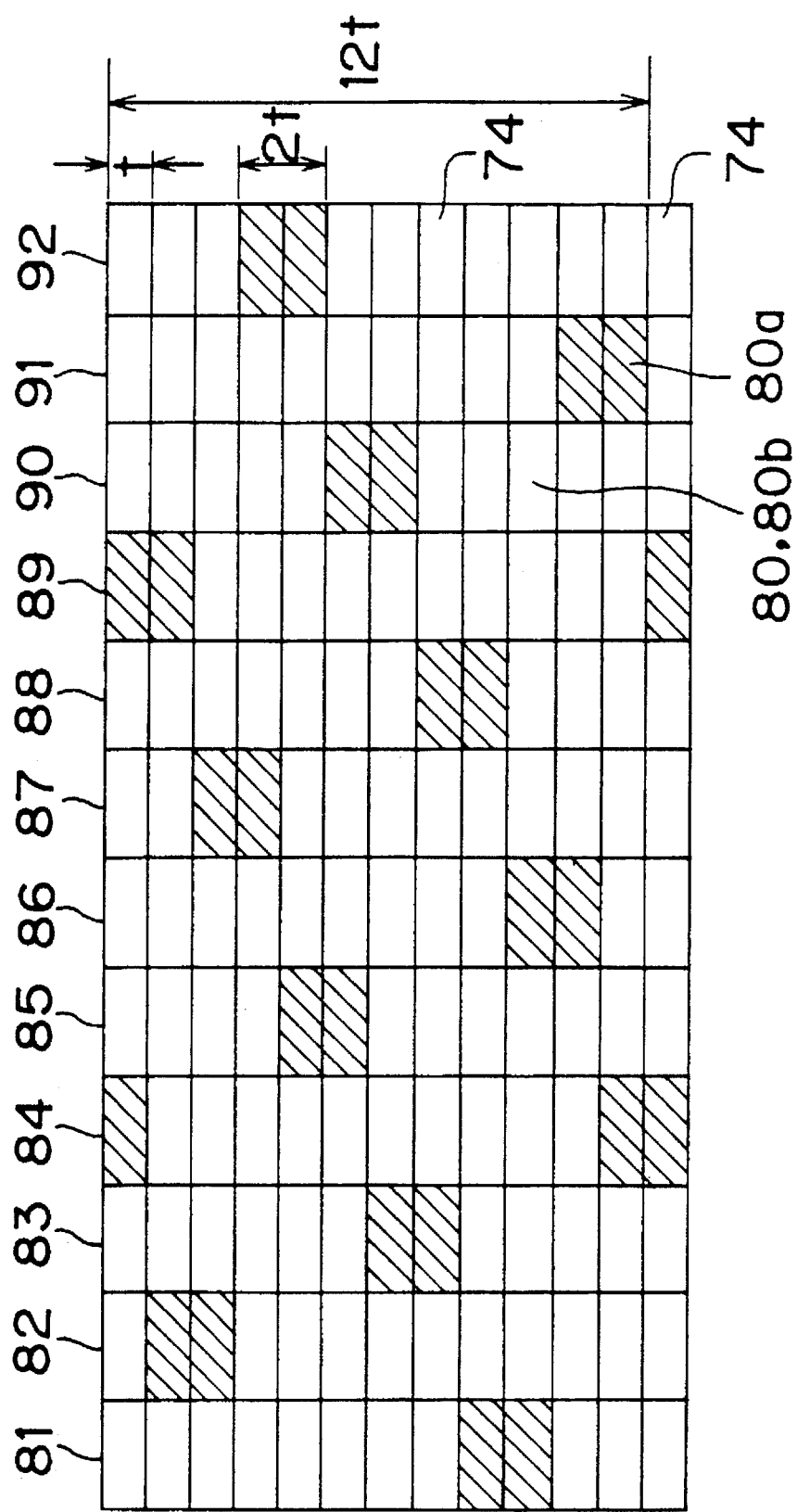
FIG. 9 is an expanded view of mover teeth formed by laminating the mover iron plates of FIG. 8 with rotation by a predetermined angle as viewed from a stator.
Figure 11:
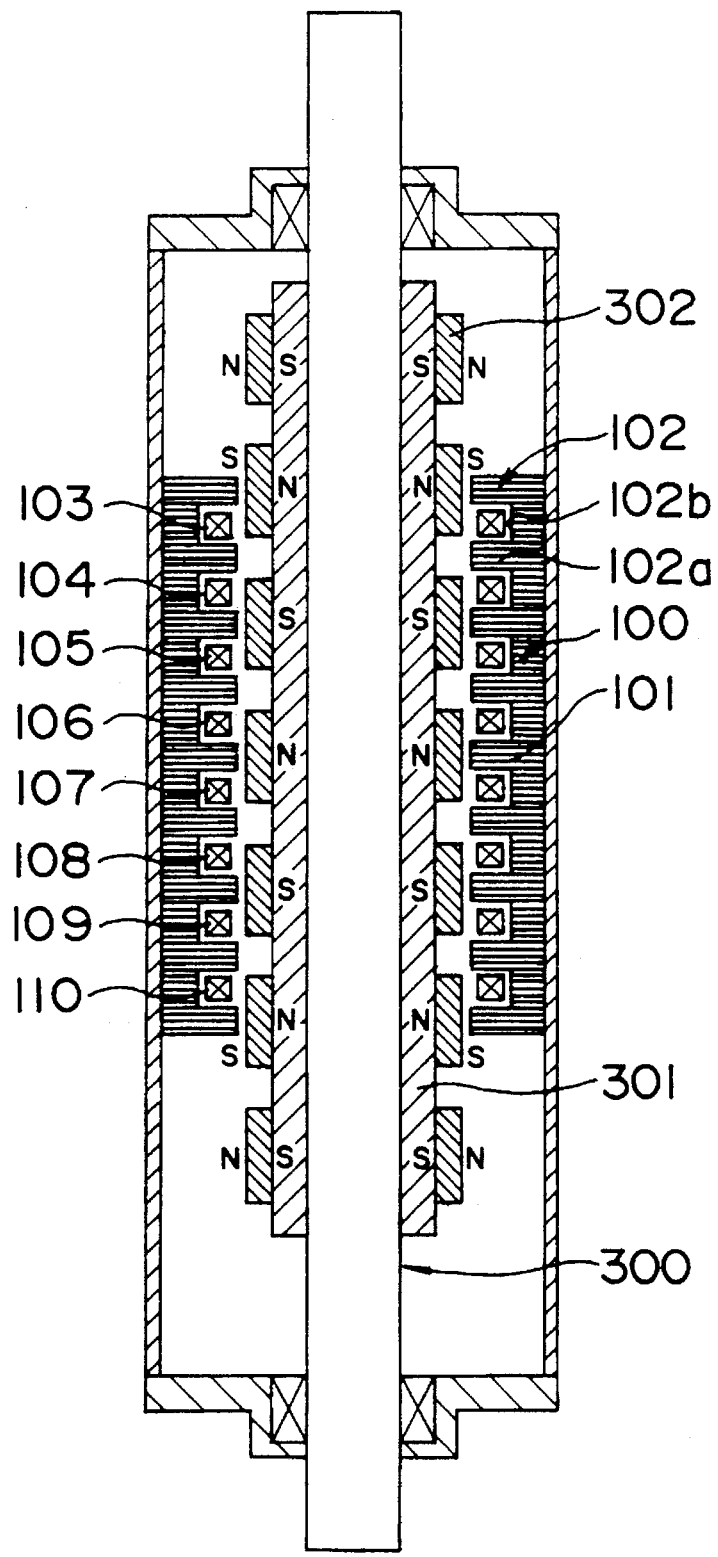
FIG. 11 is a transverse sectional view of a permanent magnet type cylindrical linear motor of a related art.
Figure 12:
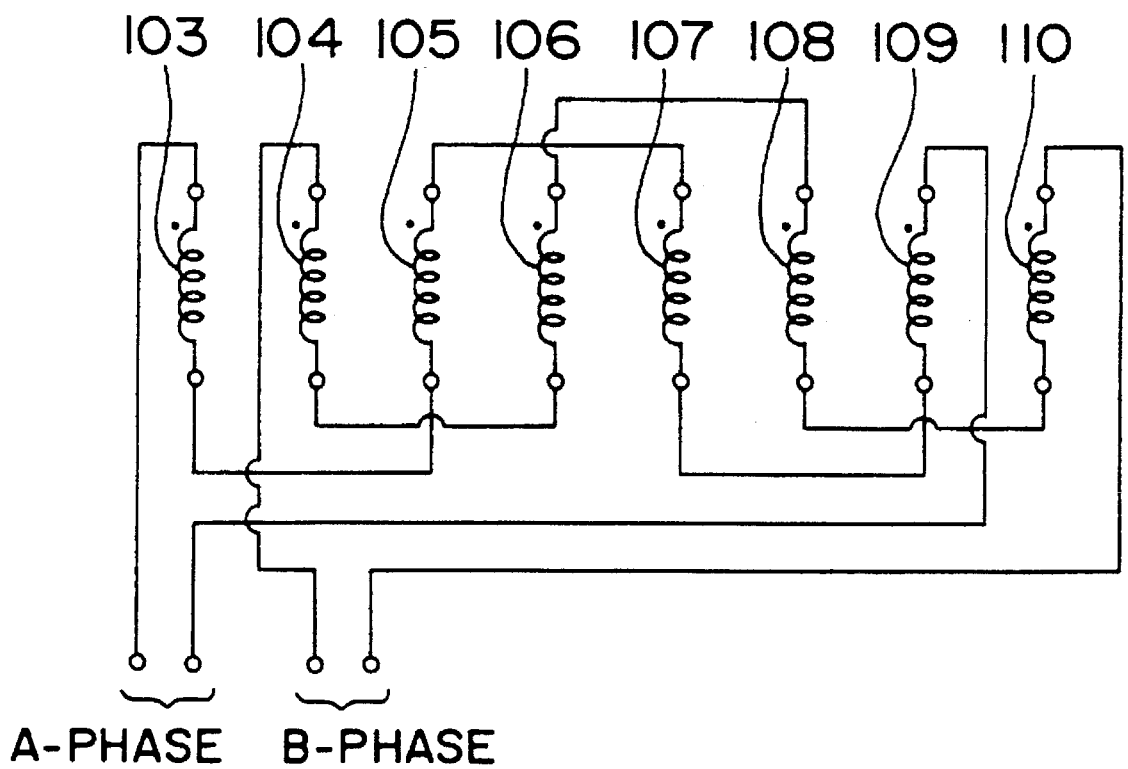
FIG. 12 is a connection diagram of stator windings of FIG. 11.

FIG. 9 shows mover teeth 80 of outer peripheral portions 81, 82, 83, . . . 92 of the mover core 70 formed by laminating mover core elements 74 formed by a predetermined number of mover iron plates 71 laminated to have a thickness of t with the mover core elements being rotated by an angle of 150/k degrees or 150 degrees for k=1 as viewed from the stator 1. Hatched portions represent tooth tops 80a and blank or unhatched portions represent tooth bottoms 80b. By laminating the mover core elements 74 with sequential rotation, teeth having a tooth pitch of 12t (a thickness of the tooth is 2t and a thickness of the tooth bottom is 10t) are formed at the outer peripheral portions 81, 82, 83, . . . 92. Accordingly, a pitch of the permanent magnet poles 63 disposed in the stator core 50 is 6t (a half of the tooth pitch of the mover).

In FIG. 7, two pairs of salient poles 51, 52 and 57, 58 disposed adjacent to each other constitute one set of salient pole group composed of N/m salient poles, that is, 4 salient poles having a relation disposed uniformly at an angle of (720 m/N) degrees, that is, 180 degrees for m=3 and N=12k=12. Salient poles 53, 54; 59, 60 and salient poles 55, 56; 61, 62 constitute other two sets of salient pole groups each composed of four salient poles having the same disposition relation, so that m=3 sets of salient pole groups are formed as a whole.

Windings W51, W52, W57; W55, W56, W61; and W59, W60, W53 wound on {(N/m)−1} or three salient poles of four salient poles constituting each of the salient pole groups, that is, the salient poles 51, 52, 57; 55, 56, 61; and 59, 60, 53 are connected as shown in FIG. 10 to form A, B and C phases, respectively, to thereby constitute a three-phase motor.

The windings for the A, B and C phases are connected as shown in FIG. 10 in the same manner as the preceding embodiment. The salient poles 54, 58 and 62 which do not participate in the phase configuration of the salient pole group and the windings W54, W58 and W62 thereof constitute sensor poles $S_C$, $S_A$ and $S_B$, respectively.

Accordingly, with the above configuration, a three-phase permanent magnet type cylindrical linear pulse motor including the position sensors can be configured. In this case, the basic amount of movement for each step is a quarter of the tooth pitch of the mover teeth 80, that is, 3t (where t is a thickness of the mover core element 74). Further, since the sensor poles $S_A$, $S_B$ and $S_C$ for detecting the position and the movement direction of the mover 3 are provided, the linear pulse motor can be operated as a brushless DC servo motor.

The technique of the present invention is not limited to the technique of the embodiments and may be another means for attaining the similar function. Further, the technique of the present invention can be modified and added variously within the scope of the above configuration.

As apparent from the above description, according to the present invention, the two- or three-phase permanent magnet type linear pulse motor or brushless DC permanent magnet type linear motor can be configured and the windings wound on the salient poles are disposed in the stator core in the circumferential direction. Accordingly, the winding accommodation portion can be enlarged to increase the ampereconductors without dependency on the tooth pitch, so that the small linear motor having large driving force can be configured.

Furthermore, since the permanent magnet poles are disposed on the side of the stator, a long stroke can be obtained without increasing the length of the motor. Since a predetermined number of mover iron plates can be laminated to form the mover core elements and the stator core elements can be laminated with sequential rotation by a predetermined angle to form the mover core, the productivity thereof is excellent.

In addition, since the sensor poles for detecting the position and the movement direction of the mover is included, the linear servo system can be formed inexpensively as the brushless DC linear motor without the need of providing detection means such as an encoder and a resolver separately.

We claim:

1. A linear motor comprising a stator including a stator core having an even number of salient poles disposed at an equal pitch angle radially inward and windings wound on said salient poles individually and a mover including a mover core disposed within said stator to be supported movably in the shaft direction and having a plurality of mover teeth disposed on an outer peripheral surface thereof in the shaft direction, characterized in that a plurality of permanent magnet poles magnetized radially to have polarities different alternately in the shaft direction are disposed at an equal pitch on inner peripheral surfaces of said salient poles of said stator core and said mover teeth are disposed at a pitch equal to twice the disposition pitch of said permanent magnet poles, said mover core being formed by laminating mover core elements each formed by laminating a predetermined number of mover iron plates of said mover core with said mover core elements being rotated sequentially by an angle determined by an arrangement of teeth disposed on outer peripheral portions of said mover iron plates, said stator salient poles being constituted by pairs of said salient poles adjacent to each other and including m sets of salient pole groups each composed of (N/m) salient poles disposed uniformly at an angle of (720 m/N) degrees where the number of salient poles is N and the phase number of said motor is m, said windings wound on (N/m)−1 or (N/m)−2 salient poles belonging to said salient pole groups being connected to have opposite polarities to each other between said pair of salient poles and being connected to have the same polarity to each other between said salient poles which do not constitute said pair of salient poles and are disposed opposite to each other to interpose said salient pole pair belonging to other salient poles therebetween to constitute phase windings for m phases, remaining salient poles which do not participate in phase configuration of said salient pole group for the phases being caused to detect a position in the shaft direction and a movement direction of said mover as sensor poles, whereby said linear motor can be operated as an m-phase linear pulse motor or a brushless DC linear motor.

2. A linear motor according to claim 1, wherein said stator core includes 8k salient poles when the phase number m is 2 and k is an integer larger than or equal to 1, and k sets of tooth groups each set having two teeth disposed with an angle of (135/k) degrees therebetween are disposed on an outer peripheral portion of said mover iron plate, said tooth groups being disposed with an angle of (360/k) degrees one another, said mover core being formed by said mover core elements laminated with sequential rotation by (135/k) degrees, a disposition pitch of said permanent magnet poles disposed on said stator core being 4t when a thickness of said stator core element in the shaft direction is t.

3. A linear motor according to claim 1, wherein said stator core includes 12k salient poles when the phase number m is 3 and k is an integer larger than or equal to 1, and k sets of tooth groups each set having two teeth disposed with an angle of (150/k) degrees therebetween are disposed on an outer peripheral portion of said mover iron plate, said tooth groups being disposed with an angle of (360/k) degrees one another, said mover core being formed by said mover core elements laminated with sequential rotation by (150/k) degrees, a disposition pitch of said permanent magnet poles disposed on said stator core being 6t when a thickness of said stator core element in the shaft direction is t.

* * * * *